United States Patent [19]
Sloan et al.

[11] Patent Number: 5,213,060
[45] Date of Patent: May 25, 1993

[54] PET RAMP

[76] Inventors: Lois C. Sloan, 20924 Snag Island Dr. E., Sumner, Wash. 98390; Heidi LeBeau, 7705 Hampton Ave., Apt #323, Los Angeles, Calif. 90046

[21] Appl. No.: 833,538

[22] Filed: Feb. 10, 1992

[51] Int. Cl.[5] .............................................. A01K 29/00
[52] U.S. Cl. ....................................... 119/82; 119/29; 119/28.5; 5/658
[58] Field of Search ..................... 119/19, 28.5, 82, 29; 5/625, 626, 659, 658, 426

[56] References Cited

U.S. PATENT DOCUMENTS

| | | | |
|---|---|---|---|
| 34,971 | 4/1862 | Lambert | 5/625 |
| 2,751,608 | 6/1956 | Lucas | 5/426 |
| 2,779,489 | 1/1957 | Boom | 119/82 |
| 3,173,398 | 3/1965 | Raymond | 119/28.5 |
| 4,970,739 | 11/1990 | Bradford | 5/625 |

Primary Examiner—John G. Weiss
Attorney, Agent, or Firm—Darby & Darby

[57] ABSTRACT

A pet ramp having a frame with flexible material mounted on the frame. The ramp is intended to be inclined against and supported at its top end by a bed. A first anchoring means, in the form of a flap of material extending from the frame, is provided for securing the frame to the bed, while a second anchoring means, in the form of high friction cups on the ends of the frame engaging the floor, secures the bottom end of the frame against slippage. The flap slips between a mattress and a box spring of the bed and is securely held there, so the frame will not move.

13 Claims, 4 Drawing Sheets

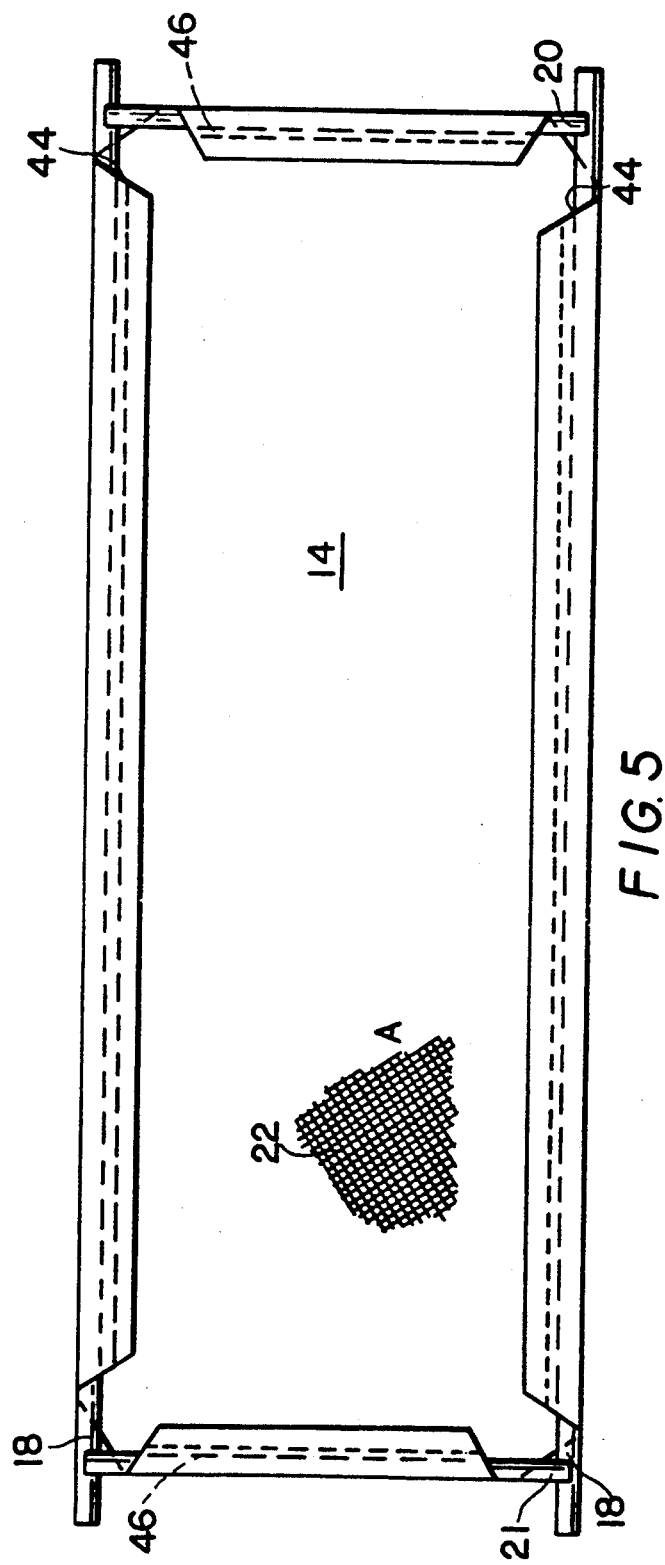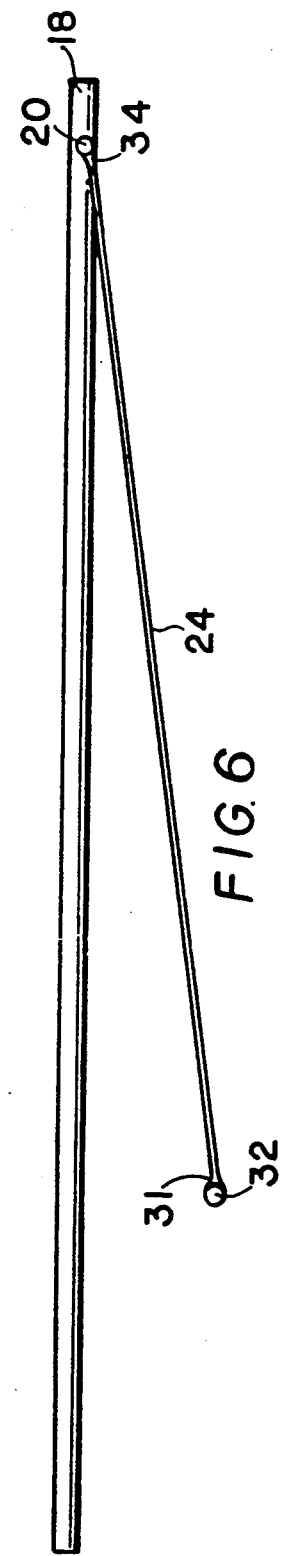

PET RAMP

FIELD OF THE INVENTION

The invention relates generally to gangways for movement of animals to different heights. More specifically, the invention relates to a ramp for allowing small household animals to climb onto a bed.

BACKGROUND OF THE INVENTION

Household pets, such as dogs, can often be creatures of habit. They may have their favorite toy, but especially can have their favorite place to sleep. Unfortunately, this place may not always be where the owner would like it. If the owner wishes to train the pet to a particular place, they can put a soft cushion there and hope, or keep the pet there each night, until he learns to go by himself. Regardless of the method, however, the training must start when the pet is as young as possible. Once fully grown, new tricks become hard to teach.

Some pet owners wish to have their pets sleep in the same bed with them, for reasons including warmth, companionship or security. It therefore becomes important for these owners to train their pets early in life to sleep in the bed. If not, the pet may stay in the bed for a time, but will at some point in the night return to the favorite spot he has become accustomed to favor.

The problem arises when a young pet, such as a puppy, must be trained to climb onto a bed that is too high and physically impossible to climb. Once the dog has grown, he will be able to jump onto the bed with no difficulty, but beginning the training then would be too late. Additionally, smaller breeds of dogs may never achieve the necessary size and older, disabled or injured pets may find it impossible to jump onto the bed. It is thus necessary to provide a means for allowing the pet to climb onto the bed.

A common device for allowing animals to reach different heights are ramps. This type of ramp has usually taken the form shown in U.S. Pat. No. 3,618,568, wherein a pet house is disclosed having a ramp as an entrance means. The ramp is a hinged plank of solid material, such as wood, and includes added steps or slats to provide traction for the pet as he climbs the ramp.

It is possible to provide such a ramp for a bed, although impractical. The ramp would be quite heavy, making it a nuisance to install or store. Without any attachment means to the bed, the ramp's own weight would cause it to slide and fall. The size of the ramp, even though it is possible to fold it, as in U.S. Pat. No. 3,618,568, makes it cumbersome to store when the owner would not want it seen.

Thus, it is an object of the invention to provide a device that allows a pet to easily ascend onto a bed.

It is another object of the invention to provide a device that is securely attached to the bed.

It is a further object of the invention to provide a device that is easily and inexpensively manufactured, easily assembled, collapsible and portable.

SUMMARY OF THE INVENTION

In accordance with the present invention, a pet ramp is constructed having a frame with flexible material mounted on the frame. The ramp is intended to be inclined against and supported at its top end by a bed. A first anchoring means is provided for securing the frame to the bed, while a second anchoring means secures the bottom end of the frame against slippage on a lower surface. The first anchoring means is a flap that slips between the mattress and box spring of a bed and is securely held.

BRIEF DESCRIPTION OF THE DRAWINGS

The foregoing and other objects and advantages will become apparent to those skilled in the art upon reading the detailed description of the invention in conjunction with a review of the appended drawings, wherein:

FIG. 5 is a plan view of a pet ramp according to the present invention; and

FIG. 6 is a side view of a pet ramp.

DETAILED DESCRIPTION OF THE PREFERRED EMBODIMENTS

Figure 1:
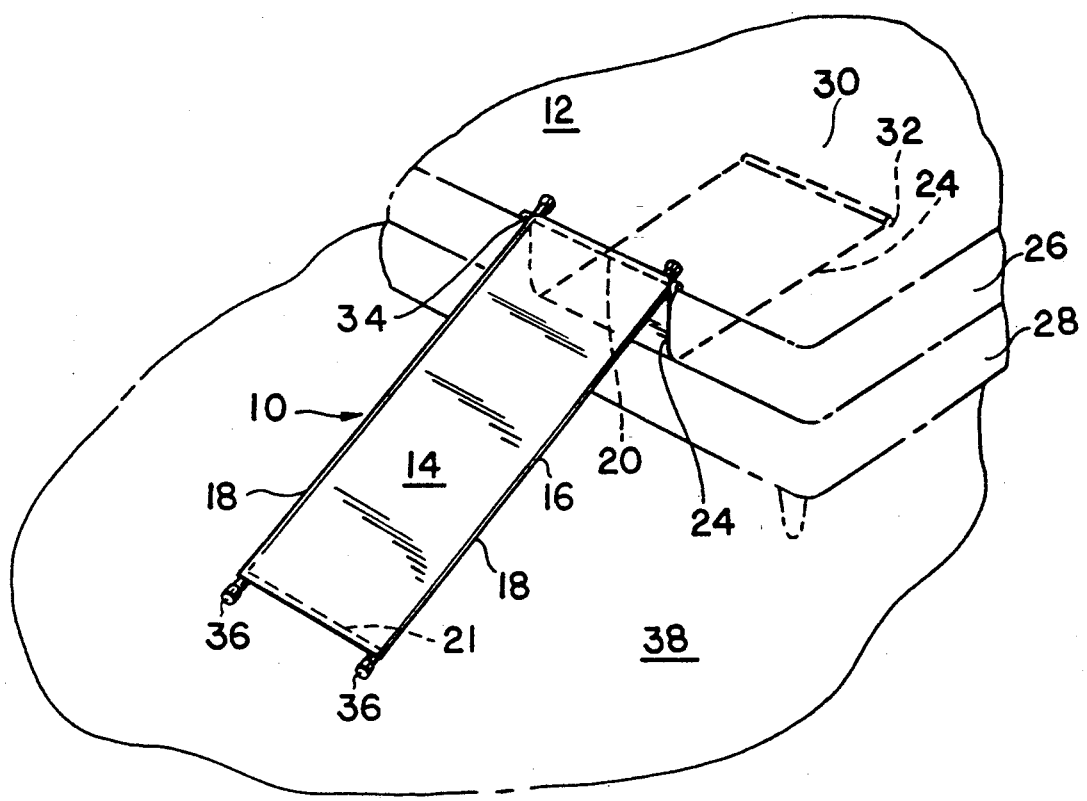
FIG. 1 is a perspective view of a pet ramp according to the invention.

Referring now to FIG. 1, a pet ramp 10 is shown in position against a bed 12. The sloped portion of the ramp is preferably embodied by a ramp material 14 attached to a frame 16 as described more fully below. The frame 16 is inclined against a side of the bed with the top of the frame 16 anchored to the bed 12, to avoid motion of the ramp 10.

The frame 16 of the preferred embodiment is a rectangle formed by four rods 18,20,21 preferably constructed from wood, although any material strong enough to support a pet on the ramp 10 will work similarly. The two longer side rods 18 are the limiting factor in deciding on a suitable material, as their significantly longer length, compared to the cross rods 20,21, translates into greater stress at the middle of the side rods.

The ramp material 14 is preferably a canvas or other flexible fabric mounted on the frame 16 so that the grain 22 of the material 14, shown at position A in FIG. 5, will be skewed at a 45° angle to the side rods 18. Since a significant component of the force on the material 14 by the pet will be parallel to the side rods 18, i.e., down the ramp 10, angling the grain prevents adjacent threads of the material 14 from being easily separated by the force. The ramp material 14 also preferably sags and stretches a small distance under the weight of a pet, allowing for a local decrease of the incline with respect to horizontal in the portion of material around the pet's paws. If the material 14 were completely taut and did not sag, the incline against the paws would remain equal to the incline of the side rods 18, which would be difficult for a small pet to climb without a high-friction surface that might be irritating or injurious to the soft pads of its paws. The angle of the grain also allows the material 14 to stretch without separating adjacent threads.

The top end of the ramp is secured to the bed by an extended flap 24 (FIG. 1) preferably connected to the top cross rod 20 of the ramp 10. The top must be secured against forward motion if the pet jumps onto the ramp 10 after a running start. Without the anchor flap 24, the ramp 10 would slide forward, increasing its angle with respect to the horizontal and making it difficult or impossible for the animal to climb. The anchor flap 24 is a piece of flexible material, preferably the same as the ramp material 14, which preferably extends from the top cross bar 20 to an area between two layers of the bed. In most instances, this would be between a mattress 26 and a box spring 28, although any configuration, such as two mattresses or a mattress and a platform, will work similarly. By having the end 30 of the flap 24 between the two layers, it is frictionally held against movement. Thus, the top end of the ramp 10 is prevented from moving forward, since this would require the flap 24 to pull out from between the layers 26,28.

To aid in the frictional engagement between the flap 24 and the two layers 26,28, a member 32, such as a dowel, is preferably inserted into a pocket 31 formed by folding over and stitching the end 30 of the anchor flap 24. The dowel 32 provides a surface transverse to the flap 24 for the layers 26,28 of the bed 12 to engage, increasing the frictional contact.

Figure 2:
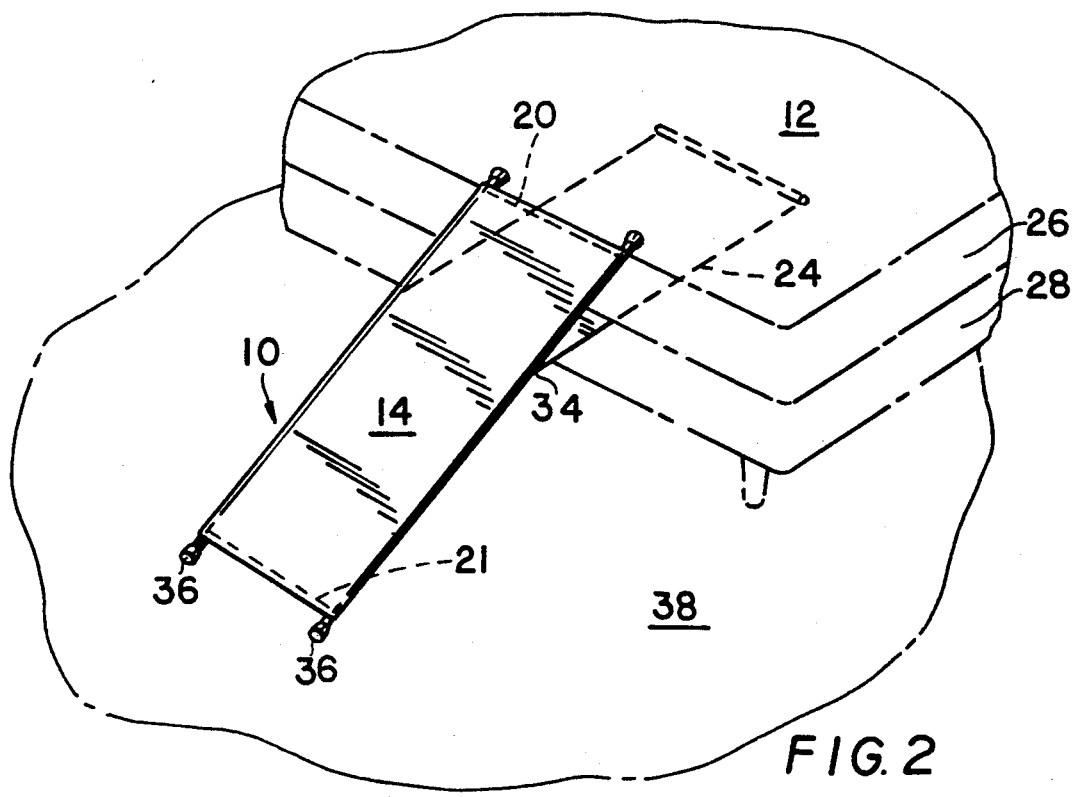
FIG. 2 is a perspective view of an alternate embodiment of a pet ramp according to the invention.
Figure 3:
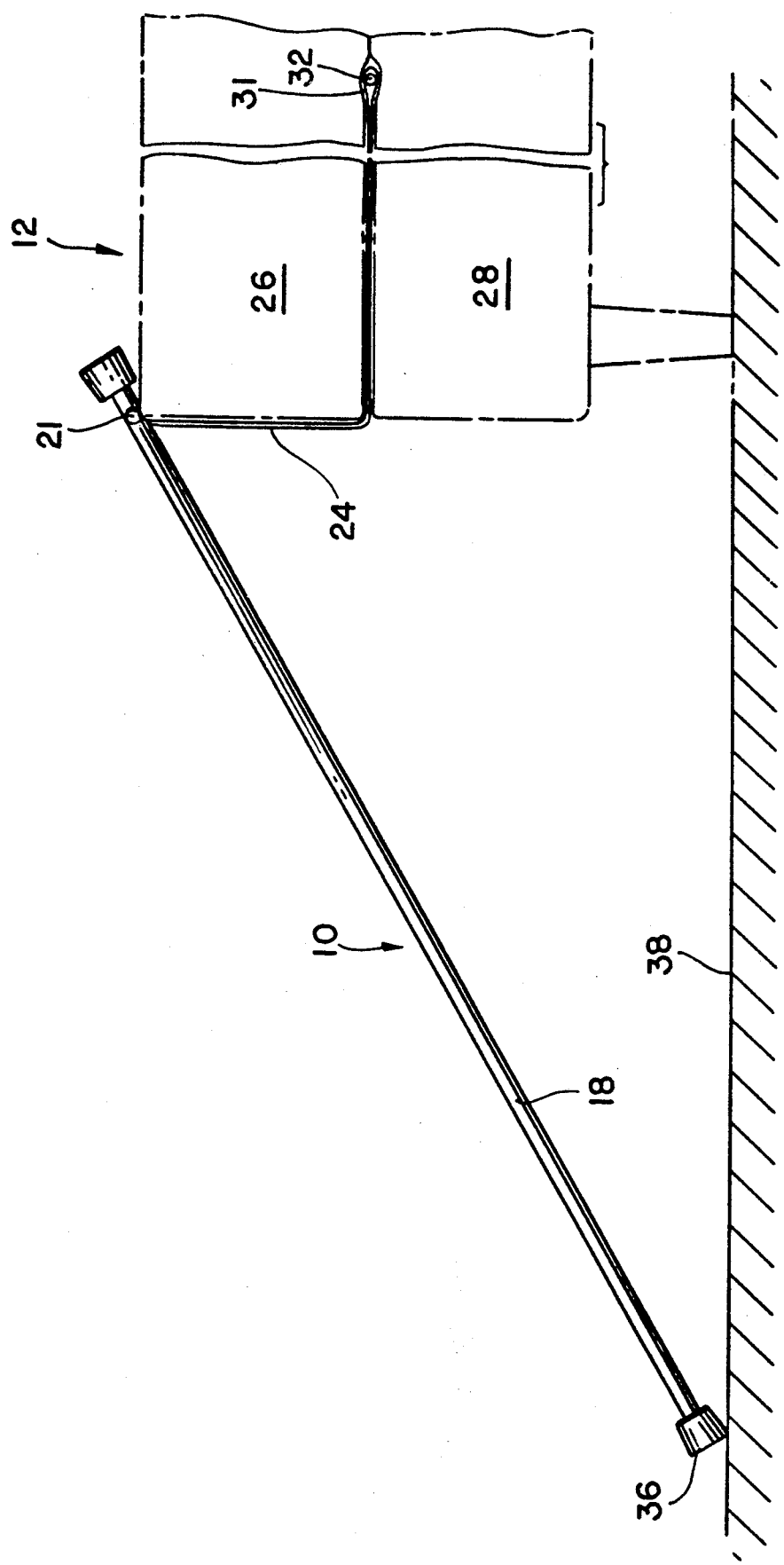
FIG. 3 is a side view of a pet ramp as in FIG. 1 and a portion of a bed.

Other configurations of the flap 24 are possible, such as that shown in FIG. 2, where the proximal end 34 of the anchor flap 24 is not attached to the top end of the ramp 10, but to a position along the length of the ramp 10. By carefully selecting this position, the anchor flap 24 can provide some resistance to both forward and rearward motion of the ramp 10.

Regardless of the position of the anchor flap 24, it is preferred that anchor feet 36 be placed at the bottom ends of the two side rods 18. These can be any known type of cap, such as a rubber cap, that increase the coefficient of friction of the ramp 10 with the floor 38. Depending on the floor surface 38 used with the ramp 10, it is also contemplated that the bottom end of the side rods 18 could be roughened or sharpened to achieve the same effect.

Figure 4:
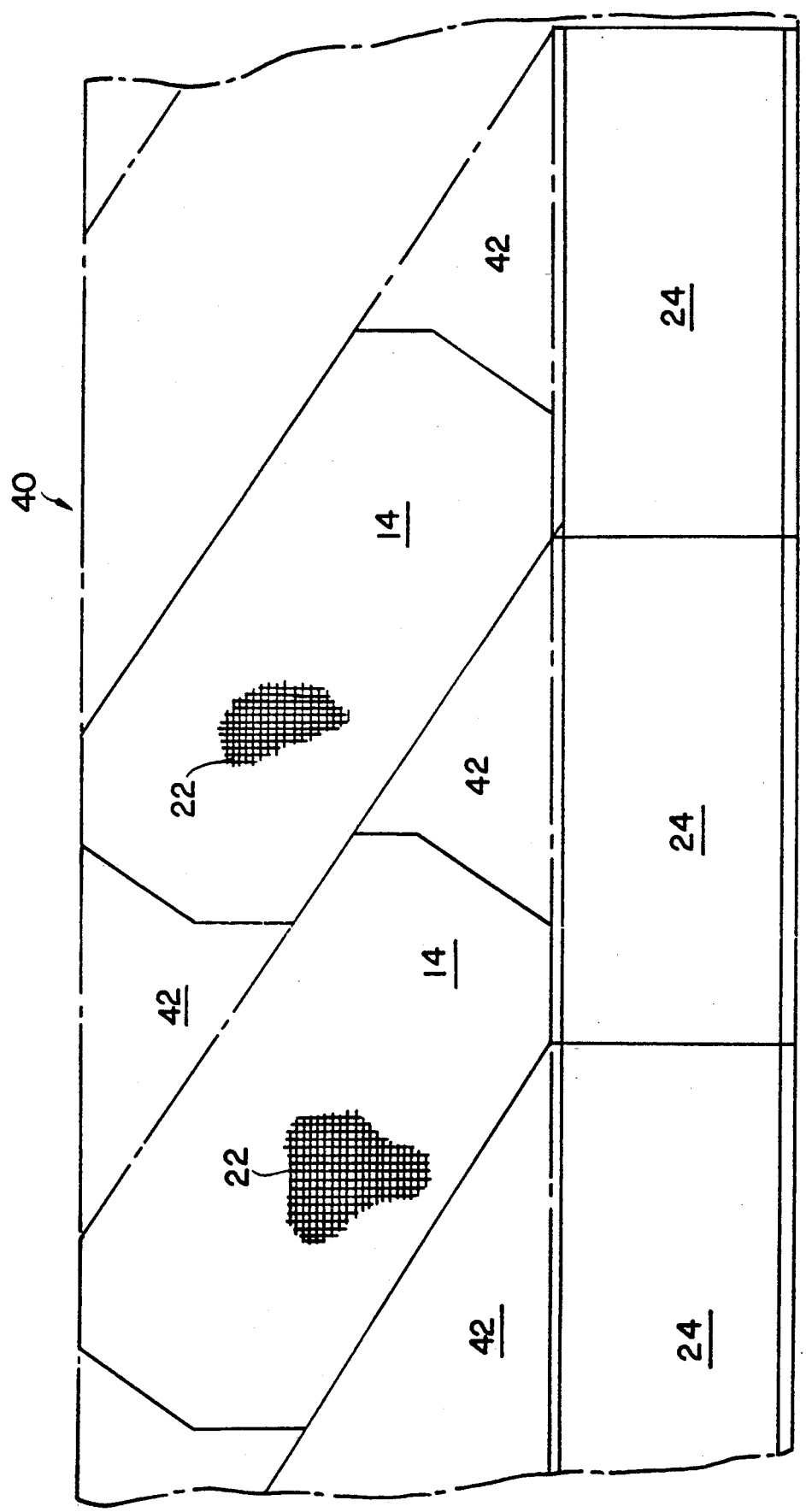
FIG. 4 is a top view of a strip of material used in construction of a pet ramp according to the invention.

FIG. 4 shows a bolt of fabric 40 used in the manufacture of the preferred embodiment. The width of the bolt 40 is preferably the commonly available 54". The ramp material 14 is cut from the bolt 40 on a diagonal to achieve the angle of the grain with respect to the side rods 18 in the finished product. The anchor flaps 24 are cut from the remaining band of material, leaving a minimum of discarded material 42.

Once the ramp material is cut, the edges can be folded over and stitched to form pockets 44,46 (FIG. 5). The side rods, which are preferably standard 48" long dowels, are prepared with a hole at each end, the hole preferably not penetrating the entire width of the dowel. The side rods 18 are then inserted into the long pockets 44 along the length of the ramp material 14. Other standard 48" dowels can preferably be cut into three 17" pieces, forming the cross rods 20,21, only two of which are used for each ramp. The cross rods 20,21 are then inserted into the short pockets 46 and into corresponding holes in the side rods, stretching the material taut. It is contemplated that more than one hole could be put into the side rods 18 to allow for variations in the length of the material 14, perhaps due to shrinkage from repeated washing or use. In this embodiment, it will be seen that the cross rods 20,21 will need to have a smaller diameter than the side rods 18 or the ends of the cross rods 20,21 will need to be tapered if they are to enter holes in the side rods 18.

The anchor flap 24 is attached to the top cross rod 20 in the preferred embodiment of FIG. 1. This can be accomplished by various means, such as stitching the flap 24 to the ramp material 14 at the rod 20, or forming small loops at the corners of the flap around the top cross rod 20. Of course, these loops would have to be threaded before the cross rod 20 was engaged to the side rods 18. In the alternate embodiment of FIG. 2, the anchor flap 24 can be attached to the ramp material 14 or side rods 18 along the midsection, by stitching or other connection techniques. In the preferred embodiment, the top end of the side rods 18 would be finished smooth, or would have caps to prevent injury to the pet.

The construction of the ramp also allows for quick disassembly for storage or transport. By pulling the cross rods 20,21 from their respective holes, the rectangle of the ramp will collapse to a small size. The whole assembly can also be moved to a different position on a bed 12 or to a different bed by pulling the anchor flap 24 from between the layers 26,28 of the bed 12. This may require lifting an upper layer 26 slightly. The flap is then reinserted between the layers 26,28 in another area or bed.

It is contemplated that the ramp 10 of the present invention could be used with other pieces of furniture, such as couches or chairs, as long as they have layers to receive the flap.

Thus, it can be seen that the present invention provides a safe, easily constructed ramp for a small pet to climb onto a bed 12. The ramp 10 is securely anchored to the bed 12 by the flap 24, preventing ramp 10 movement, which could lead to injury of the animal or future apprehension of the animal to climbing onto the bed 12.

While the embodiments of the invention shown and described are fully capable of achieving the results desired, it is to be understood that these embodiments have been shown and described for purposes of illustration only and not for purposes of limitation.

What is claimed is:

1. A ramp for assisting animals in climbing from a first surface onto a higher surface of an article having at least two layers, comprising:
    an inclined member having a length defining a longitudinal direction and a width defining a lateral direction generally perpendicular to the longitudinal direction, said width being less than said length, said member extending from said first surface to said higher surface; and
    an anchor flap having proximal and distal ends, said proximal end connected to said member generally along the lateral direction and said flap extending from said member generally in the longitudinal direction, said distal end being adapted to be retained between said layers.

2. A ramp as in claim 1 wherein said proximal end is attached to a portion of said member adjacent said higher surface.

3. A ramp as in claim 1 wherein said proximal end is attached to a portion of said member remote from said higher surface.

4. A ramp as in claim 2 wherein said member is comprised of a quadrilateral frame and a fabric attached to said frame, said quadrilateral frame being comprised of a plurality of dowels, said fabric being formed with pockets to receive said dowels.

5. A ramp as in claim 3 wherein said fabric has a grain, said grain being oriented at an acute angle with respect to said frame.

6. A ramp as in claim 4 wherein said article is a bed and at least one of said layers is a mattress.

7. A ramp as in claim 6 wherein another of said layers is a box spring, said flap being retained between said mattress and said box spring.

8. A ramp as in claim 1 wherein said flap is flexible and frictionally engaged between said layers.

9. A ramp as in claim 6 wherein said distal end of said flap further comprises a retention member for presenting a surface transverse to said flap to improve said frictional engagement therewith.

10. A ramp as in claim 3 wherein said frame further comprises anchor feet to improve the coefficient of friction between said surface and said frame.

11. A ramp for assisting animals in climbing from a first surface onto a higher surface of an article, comprising:
   an inclined member having a length defining a longitudinal direction and a width defining a lateral direction generally perpendicular to the longitudinal direction, said width being less than said length, said member extending from said first surface to said higher surface, said member comprising a flexible material in a disassembleable frame; and
   an anchor flap having proximal and distal ends, said proximal end connected to said member generally along the lateral direction and said flap extending from said member generally in the longitudinal direction, said distal end being releaseably attached to said article.

12. A ramp as in claim 11 wherein said one of said surfaces has a higher elevation than the other of said surfaces.

13. A ramp for assisting animals in movement between two surfaces having different elevations, one of said surfaces being on an article having at least two layers, comprising:
   an inclined member having a length defining a longitudinal direction and a width defining a lateral direction generally perpendicular to the longitudinal direction, said width being less than said length, said member extending between said surfaces; and
   an anchor flap having proximal and distal ends, said proximal end connected to said member generally along the lateral direction and said flap extending from said member generally in the longitudinal direction, said distal end being adapted to be retained between said layers.

* * * * *